April 7, 1953 R. R. CROOKSTON 2,633,629
METHOD OF EQUIPPING WIRE LINE DRUMS WITH SPACING STRIPS
Filed Nov. 1, 1950

INVENTOR.
Robert R. Crookston,
BY
J. G. McKean
ATTORNEY.

Patented Apr. 7, 1953

2,633,629

UNITED STATES PATENT OFFICE 2,633,629

METHOD OF EQUIPPING WIRE LINE DRUMS WITH SPACING STRIPS

Robert R. Crookston, Houston, Tex., assignor, by mesne assignments, to Standard Oil Development Company, Elizabeth, N. J., a corporation of Delaware Application November 1, 1950, Serial No. 193,461

1 Claim. (Cl. 29—159)

This application is directed to a method of equipping hoisting drums with spacing strips for guiding the first layer of wire rope wound on the drum into the form of a true helix.

When wire rope is to be wound or spooled on a drum, such as the draw works drum or sand reel of a rotary drilling rig, it is desirable to prepare the drum so that the first layer of rope wound on the drum has exactly N or N plus one-half number of turns. It is known that drums may be prepared for so receiving the first layer of wire rope by cutting a helical or substantially helical groove on the cylindrical surface of the drum with the grooves spaced the recommended pitch for a selected size of wire rope. However, this has the disadvantage of difficulty in machining the drum and further in limiting the drum to use only with the selected size of wire rope.

The device of the present application involves a simple, effective method for preparing a drum for receiving the first layer of wire rope. The method is not only simple and effective but in addition it has the advantage that it is a relatively simple matter to change a drum prepared for receiving the first layer of a given size of wire rope over so that it is prepared to receive another size of wire rope.

Other objects and advantages of the present invention may be seen from the following description taken in conjunction with the drawing in which Fig. 1 is an elevation showing an embodiment of a draw works drum with one embodiment of spacing strips attached thereto;

Figure 1:
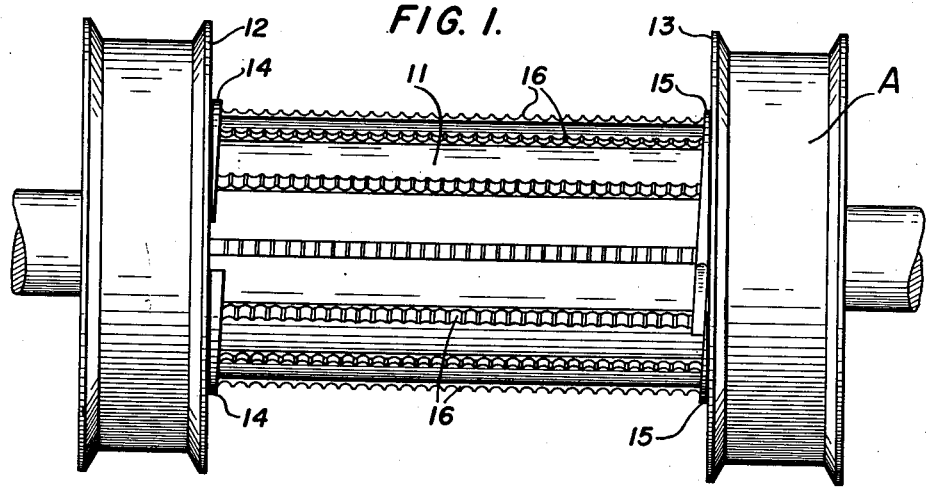
Figure 2:
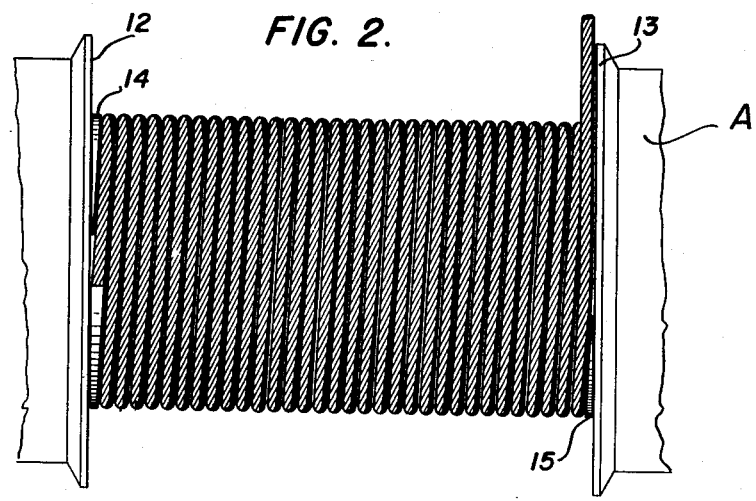
Fig. 2 is a view of the drum of Fig. 1 showing a first layer of wire line wrapped in a helix thereon.

Turning now specifically to the drawing and first to Figs. 1 and 2 a conventional hoisting drum spool A with cylindrical portion 11 and flanges 12 and 13 is provided with a conventional starter strip 14 adjacent flange 12 and a conventional filler strip 15 adjacent flange 13. It is known to the art to use starter strips and filler strips in order to fill up the space between the flanges of the drum so that the first layer of wire line of selected size will take the shape of a helix with the recommended pitch for each row and so that the wire makes exactly N or N plus one-half turns on the spool.

Mounted on drum A are spaced spacing strips 16. These spacing strips may be attached to the drum by any suitable means such as welding, brazing or with screws or bolts. It will usually be found preferable, however, to attach the strips by tacking them on with welds. In order to simplify the showing in the drawing, the specific means for attaching strips 16 to drum 11 have not been shown. Strips 16 are fabricated with grooves which have their lines spaced apart at the recommended pitch for the size of wire line to be wound on the spool. The spacing strips are arranged on the drum with the center lines of corresponding grooves defining a helix so that when a wire rope of the selected diameter for which the spacing strips, starter strip and filler strip are designed is wound on the drum it takes exactly N or N plus one-half turns on the drum with the pitch between adjacent rows within the recognized tolerances.

The starter strip is spaced adjacent the flange where the winding of the wire line begins and the filler strip is spaced on the other flange where the first layer terminates and the second layer is begun.

It is recognized among workmen skilled in the art that the preparation of the first layer of the wire rope on the drum is of paramount importance and that after the first layer has been wound on the drum properly, other layers may be added without requiring the guidance of starter strips and spacing strips.

In Fig. 2 the drum of Fig. 1 is shown with wire rope of the selected size wound in the first layer. It will be seen that the starter strip, spacing strip and filler strips have guided the first layer into the shape of a helix with the pitch between the rows of wire within the recommended limits.

Figure 3:
Fig. 3 is a view of one of the spacing strips removed from the drum of Fig. 1.

The spacing strips 16 shown in Fig. 1 are shown in side view in Fig. 3. These spacing strips may be made by placing rectangular bars of metal of the desired width and depth on the bed of a milling machine and milling the grooves to the size required. As previously explained, the prepared bars may be attached on the drum in any conventional manner. The advantage of welding is that if the strips do not fit exactly between the flanges of the drum (or between the starter strip filling strips as shown in Figs. 1 and 2) this can be readily corrected. If the spacing strips are too short (by as great an amount as ⅝ of an inch for a 42 inch drum) the strip may be made to fit by tacking one end with a weld adjacent one flange, then heating the spacing strip with the welding torch to make it expand until the free end touches the other flange and then fastening the free end of the heated strip by a weld. The welds then hold the strip in position on the drum and since the strip has expanded uniformly throughout its length, the grooves are spaced uniformly. It is necessary that the grooves be spaced uniformly along the strip although there is considerable tolerance as far as the individual grooves are concerned. If the length of the spacing strip is slightly excessive for the length of the drum, a correction may be made by placing the longitudinal axis of the strip slanting or at an angle with the longitudinal axis of the drum. Here again the grooves of the spacing strips arranged around the periphery of the drum will guide the first layer of a wire line into the form of a helix when it is wound on the drum.

Figure 4:
Fig. 4 is a view of another embodiment of a spacing strip adapted to be attached to a drum.

Fig. 4 shows another embodiment of spacing strips suitable for use in the present invention. In this embodiment the spacing strips 17 are of rather thin section so that they may advantageously be formed by pressing strips into the desired shape with the use of suitable dies. In applying spacing strips of the embodiment of Fig. 4 to a hoisting drum, they may be secured longitudinally to a drum in the same manner as the embodiment of Figs. 1 and 2 and have the same advantage as the spacing strips 16 previously described. That is to say, a spacing strip 17 if too short may be made to fit by welding one end adjacent the flange of the drum, then heating the strip with a welding torch until the free end touches the other flange of the drum and then tacking said free end with a weld in exactly the same manner as described in the embodiment of Figs. 1 to 3. Similarly, if a strip 17 has an excessive length it may be made to fit by placing it slanting on the drum. An additional advantage in the embodiment of Fig. 4 is that it is sufficiently flexible so that if its length is slightly excessive it may be made to fit by tacking one end to a flange of the drum and then forcing the other end into position, that is, by distorting the strip slightly throughout its length so that the spacing between the center lines of the grooves remains substantially equal.

Figure 5:
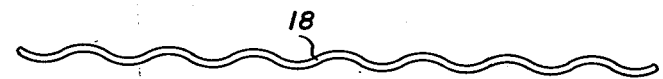
Fig. 5 is a view of another embodiment of a spacing strip adapted to be attached to a drum.

Another embodiment of a spacing strip is shown in Fig. 5. In Fig. 5 the spacing strip 18 has a corrugated or sinuous cross section with the centers of radii above the strip being spaced apart the recommended pitch for the size of wire line to be used with the drum to which the strips are applied. The embodiment of Fig. 5 may be used in exactly the same way as that of Fig. 4. Accordingly, the description of methods for applying it to the drum and of using the drum to which it is applied will not be repeated.

It will be seen that the present invention involves an inexpensive method for preparing the surface of a hoisting drum for receiving the first layer of wire line which assures that the first layer will take the desired helical form. By using the method with the present invention a hoisting drum may be prepared for one size of wire line and if at some future time it is desired to use a different wire line, the drum may easily be prepared for such purpose by removing the spacing strips (and starter and filler strips if such are used) and replacing with members designed for the new size of wire line.

Having fully described and illustrated the preferred embodiments of the present invention, what I desire to claim as new and useful and to secure by Letters Patent is:

A method of preparing a flanged hoisting drum having a cylindrical surface of fixed length between its flanges which comprises applying to said cylindrical surface a plurality of transversely grooved distortable strips to extend generally lengthwise of said cylindrical surface, physically distorting said strips to match their lengthwise extent to the said fixed length of said cylindrical surface and attaching said strips to said surface to maintain said distorted condition thereof, whereby the grooves of all the strips so applied to said drum substantially equidistantly divide the space between said flanges and positively determine the pitch of the turns of the initial layer of strand wound on said drum.

ROBERT R. CROOKSTON.

REFERENCES CITED

The following references are of record in the file of this patent:

UNITED STATES PATENTS

| Number | Name | Date |
| --- | --- | --- |
| 562,644 | McEwen | June 23, 1896 |
| 756,851 | Hartweg | Apr. 12, 1904 |
| 812,063 | Merchant | Feb. 6, 1906 |
| 1,166,536 | Munsinger | Jan. 4, 1916 |
| 1,570,061 | Henricks | Jan. 16, 1926 |
| 1,700,181 | Russell | Jan. 29, 1929 |
| 2,420,050 | Maude | Mar. 21, 1945 |